Figure 1A:
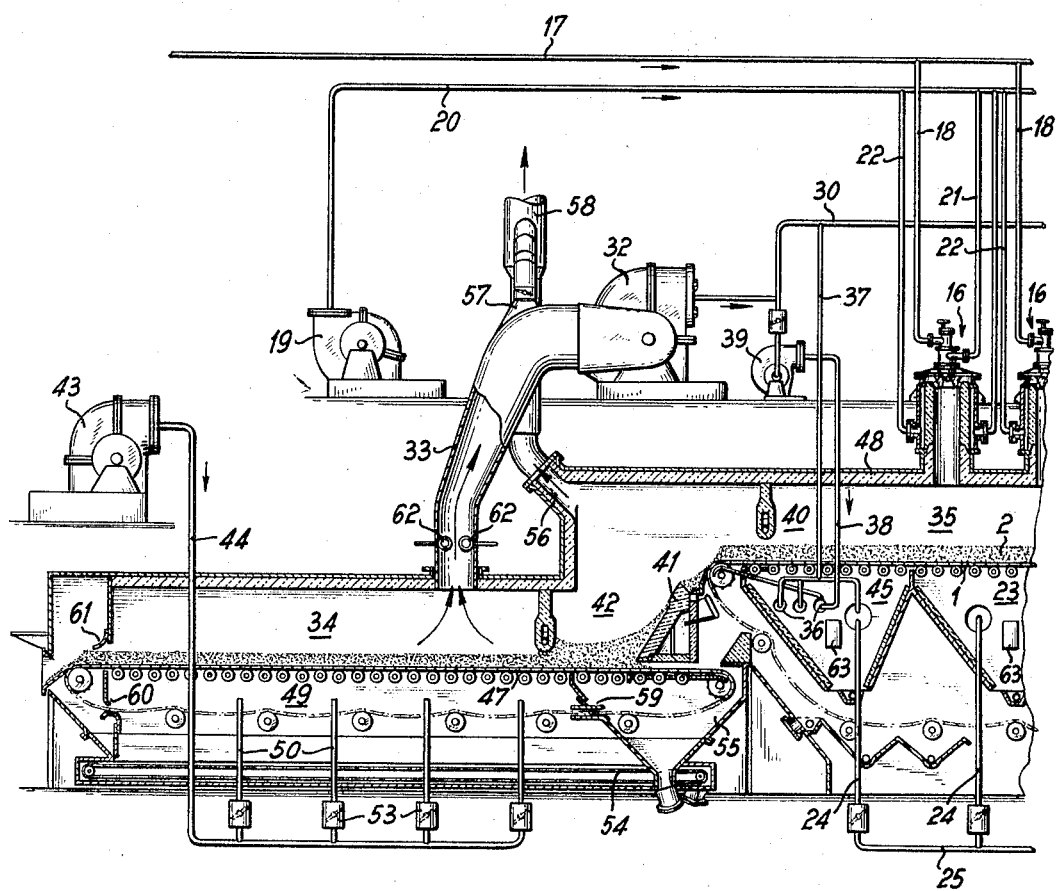

United States Patent Office 3,305,226
Patented Feb. 21, 1967

3,305,226
APPARATUS FOR DRYING AND CALCINING CRUDE PHOSPHATE PELLETS IN PLURAL CHAMBERS
Hans-Werner Ziegler, Knapsack, near Cologne, Leo Berg, Alstadten, near Cologne, and Werner Kowalski, Knapsack, near Cologne, Germany, assignors to Knapsack Aktiengesellschaft, a corporation of Germany
Filed Oct. 5, 1964, Ser. No. 401,410
Claims priority, application Germany, Oct. 19, 1963, K 39,647
1 Claim. (Cl. 263—36)

The present invention is concerned with an apparatus for drying and calcining crude phosphate pellets.

In U.S. Patent No. 3,100,106 there is described a process and an apparatus for the drying and calcining of powdered and/or granular crude phosphate pellets prepared on a granulating disk or compressed on a briquetting press.

The process described in that patent for the drying and calcining of crude phosphate pellets on a conventional travelling grate running through drying and calcining chambers which are separated from one another by means of partition walls comprises feeding recently formed wet pellets onto one end of and over the entire width of a continuously travelling first gas-pervious grate to form a uniform layer of said pellets, passing a heated gas downwardly through the pellet layer to dry the wet pellets, increasing the temperature of the gas as the layer travels along, thereafter passing downwardly through said layer of dried pellets hot combustion gases originating from externally fired fuel, raising the temperature in successive steps of such gas to such an extent that the pellets corresponding to approximately four-fifths of the total height of said layer are calcined, whereby the lowermost ⅕ serves as a protective layer for the grate, passing downwardly in a following sojourn and hardening zone a slow stream of heated gas through said moving layer to transfer part of the heat contained in the top layer of the pellets to said underlying dried protective layer, introducing said pellet layer while thoroughly intermixing the pellets into a heat compensation zone, keeping said pellets in said zone for a pre-determined duration to equalize the temperatures of the individual pellets, continuously discharging substantially uniformly hot pellets from said heat compensation zone, forming a substantially uniform layer of pellets on a second gas-pervious travelling grate, passing upwardly through said layer a stream of cooling air to cool said layer of calcined pellets, and finally discharging pellets from said second grate. In this process a portion of the gases issuing from the sojourn and hardening and cooling zones, and the gases issuing from the calcining zone can be introduced into the drying zone.

The apparatus described in U.S. Patent 3,100,106 for use in carrying out the above process comprises a drying chamber, a following calcining chamber connected to said drying chamber and provided with gas burners, a following sojourn chamber connected with said calcining chamber, a heat compensation chamber connected with said sojourn chamber, a first travelling grate passing through said drying, calcining and sojourn chambers in the order stated, a cooling chamber, said chambers being walled chambers, a second travelling grate running through said cooling chamber at a lower level than said first grate, the individual chambers being provided with gas inlet means and gas outlet means extending through said walls in a manner such that said gas outlet means are disposed below the first travelling grate, cooling gas inlet means are disposed below the second travelling grate and suction means connected with said gas outlet means.

As can be seen, the initially still green pellets are caused to travel successively on a Lepol grate through a drying zone, a gas-fired calcining zone and a sojourn/hardening zone, are delivered to a heat compensation zone, and are then caused to run on a following second Lepol grate through a cooling zone from which they are ultimately discharged in suitable form.

The present invention is concerned with an improved apparatus which for substantially the same process enables the degree of heat efficiency to be improved and pellets more uniform in quality to be obtained.

The improved apparatus of the present invention comprises partition walls disposed inside suction chambers of a calcining zone, especially partition walls disposed between individual zones, such as a drying zone, a calcining zone, a hardening/sojourn zone and a heat compensation zone, the partition walls being extended to a position immediately below the upper strand of a sintering grate so as to improve spacing of the individual zones from one another and so as to permit more exact flow of exhaust gas, hot gas and issuing gas; means permiting the return strand of the sintering grate to run outside the suction chambers of the drying zone, the calcining zone and the sojourn/hardening zone; and a drying zone having dimensions which enable exhaust gases such as drawn off from the sojourn/hardening zone through a layer of pellets coming from the calcining zone, the total amount of hot gases set free in cooling zone, and the total amount of exhaust gas obtained in the calcining zone to be used for pre-drying and heating "green" pellets in the calcining zone.

In order to enable gas flow control, the sojourn/hardening zone is equipped with cutoff and control means which through an exhaust gas blower alternatively enable in functional relationship with the calcination of the sinter material layer exhaust gas to be drawn off across the said layer from the calcining zone, which means temporary desirable spatial enlargement of the calcining zone, or enable the removal of exhaust gas to be arrested, or through a chain cooling blower enable hot gas coming from the cooling zone to be injected into the suction chamber against the upper strand of the sintering grate for cooling purposes.

Figure 1B:
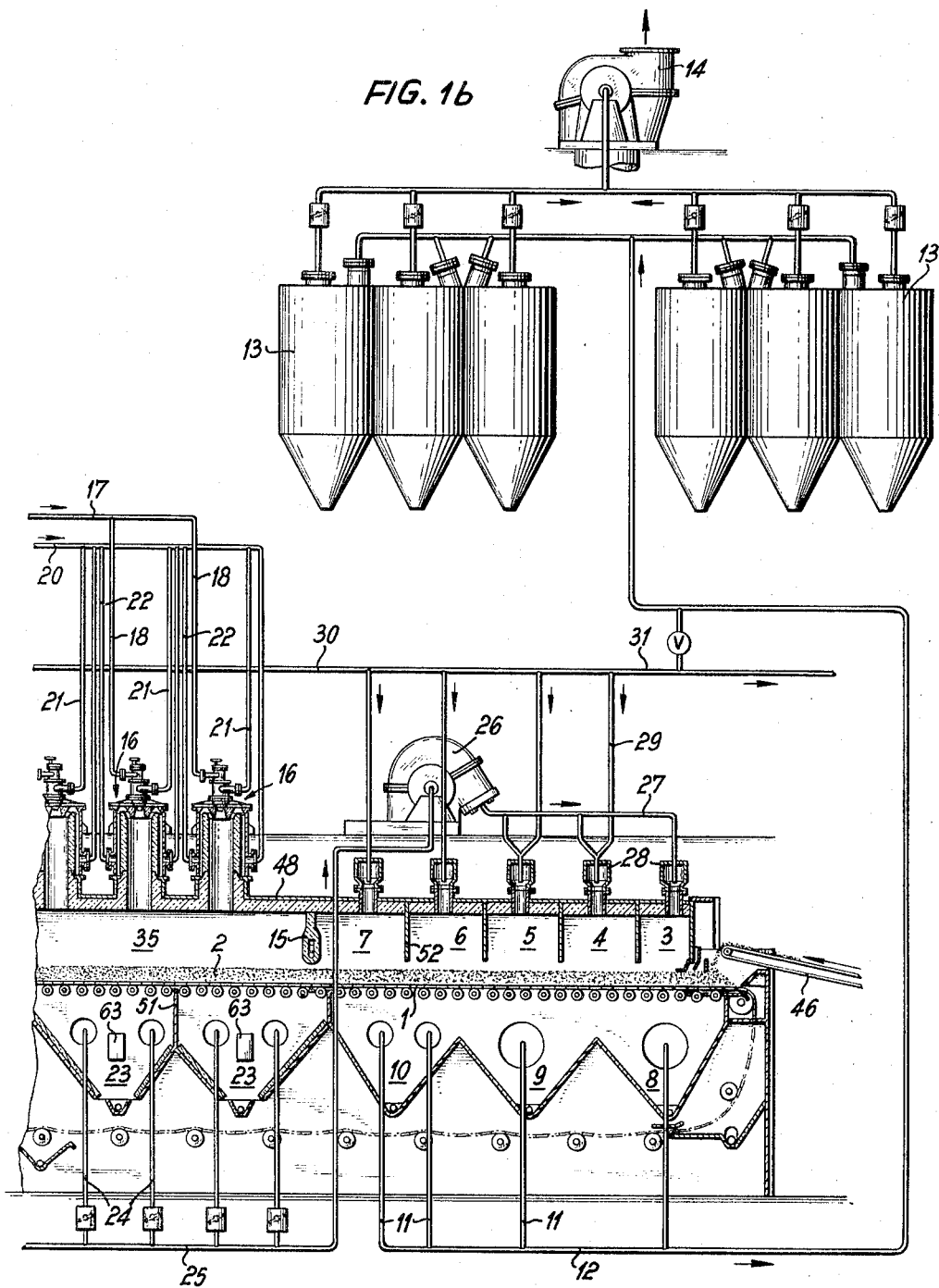

The apparatus of the present invention is shown in the accompanying drawing wherein:

FIGURE 1a is a longitudinal section showing the discharge or exit portion of an apparatus of this invention, and FIGURE 1b is a longitudinal section showing the feed or entrance portion of the apparatus shown in FIG. 1a.

Green pellets are conveyed through a suitable conveying means, e.g. conveyor belt 46 (FIG. 1a), to the sintering means and are placed in front of drying chamber 3 as sinter material 2 in a loose layer of reasonable height on the upper strand of sintering grate 1 travelling with adjustable speed. While the temperature of the material to be sintered 2 is gradually increased and its water content reduced concurrently therewith, it is caused to travel through drying chambers 3, 4, 5, 6 and 7 to be ultimately introduced into calcining zone 35 where the material is heated at maximum temperature. In the following hardening/sojourn zone 40 not specifically separated above sintering grate 1 from calcining zone 35, the sinter material 2 is allowed to "ripen" and to burn through to the lowest layers nearest to the sintering grate and in direct contact therewith, or thermal energy in excess may be dammed by injection of cooling air beneath the upper strand of sintering grate 1 until the sinter material is delivered to heat compensation zone 42 through discharge means 41 forming the object of the patent 3,155,378. The now burnt and "ripened" sinter material is allowed to stay for some prolonged time in heat compensation zone 42 so as to produce intenser heat exchange inside the sinter material packing and to improve the quality of the pellets. Heat compensation zone 42 is provided with a cooling grate 47 designed so as to extend thereinto which serves to gradually withdraw the pellets from said zone which are then conveyed through cooling zone 34 and discharged at the end portion of the cooling zone for further use.

Production, flow and thermal use of the various gas streams are critical for heat consumption and nature of the sinter material discharged from the furnace.

The amounts of heat necessary are produced primarily by the gas burners 16 seated on the arched furnace roof 48 in the region of calcining zone 35. Fuel gas supply line 17 and distributor lines 18 serve to supply fuel gas, i.e. carbon monoxide, to gas burners 16, which are fed concurrently therewith with the necessary combustion air introduced by way of fresh air blower 19 (FIG. 1a). The combustion air travels through line 20 to deliver primary air through lines 21 and secondary air through lines 22 to gas burners 16.

The combustion product, called hereinafter exhaust gas, flows in the direction of the pressure gradient produced by exhaust gas blower 26 (FIG. 1b), penetrates inside the calcining zone 35 through the sinter material packing 2 in downward direction and through the gaps left between the plates of the sintering grate 1, flows through suction chambers 23, 23 and 45 disposed therebeneath and ultimately arrives through lines 24 and collecting line 25 at the suction side of exhaust gas blower 26, which forces the exhaust gas at a temperature of about 250° C. through line 27 to penetrate into gas inlet sockets 28 allotted to drying chamber 3 or forces the exhaust gas in admixture with hot gas (any desired mixing ratio) to penetrate into drying chambers 4 and 5.

Hot gas having a temperature of about 400° C. obtained in cooling zone 34 is delivered concurrently therewith through line 33 to hot gas blower 32 and conveyed through distributor line 30 and branch lines 29 to drying chambers 6 and 7, except the hot gas portion admixed with the exhaust gas for use in drying chambers 4 and 5.

These steps enable a uniform temperature increase from about 250 to about 400° C. to be produced inside the drying zone, in which the gases injected thereinto deliver the bulk of their sensible heat to the more or less green pellets and load with steam resulting from the moisture content of the pellets which, therefore, can be dried and heated under mild conditions with no danger of bursting. The mixture comprising exhaust gas, hot gas and steam, now called outgoing air, having a temperature of about 90 to 110° C. is caused by means of outgoing air blower 14 to flow through suction chambers 8, 9 and 10 disposed below the upper strand of the sintering grate in the drying zone region, to travel through lines 11, which are extended so as to project into collecting lines 12, to pass outgoing air filter 13 and to ultimately escape into the open air.

In order to ensure that the hot sinter material 2 delivered in heat compensation zone 42 to cooling grate 47 is cooled in cooling zone 34 following heat compensation zone 42 at a lower temperature, i.e. of about 60 to 80° C. desired to be obtained in the cooling zone, the packing of baked pellets is exposed to upwardly flowing cooling air having a temperature the same as the surrounding atmosphere, the air being drawn off as so-called hot gas above the pellets' packing. Before entering hot gas blower 32, the hot gas may be caused to automatically admix with fresh air admitted through air-admitting traps 62 so as to have a temperature of about 400° C. Underneath cooling grate 47 there is disposed pressure chamber 49 which surrounds the cooling grate slack strand and into which cooling air is injected by means of cooling air blower 43, the cooling air flowing through line 44 and the allotted branch lines 50. Shutoff and control members 53 serve to produce the cooling effect desired to be obtained in each case.

Appropriate packaging of pressure chamber 49 against heat compensation zone 42 and the discharge end of cooling grate 47 ensures exact flow of the cooling air.

A further portion of hot gas conveyed by hot gas blower 32 may optionally be drawn off from line 30 through chain cooling blower 39 and injected by way of lines 37 and 38 and apertures 36 into suction chamber 45 against sintering grate 1. In other words, the said portion of hot gas having a temperature of about 400° C. is used for cooling sintering grate 1 when its temperature which should not exceed 550 to 600° C. is beyond that range so as to obviate too abrupt a change of temperature on sintering grate 1 and hence premature embrittlement of the alloyed steel used as construction material.

A last portion of hot gas can ultimately be caused to travel through line 31 to the phosphate grinding/drying means.

As can be seen from the above, the outgoing air and in addition thereto the total amount of hot gas set free in cooling grate 34 are fed to the drying zone or are partially fed to the grinding/drying means so that hot gas need no longer be drawn off from cooling grate 34 to escape through a chimney.

The shutoff and control members 53 on the other hand permit through hot gas blower 32 to eliminate exhaust gas from calcining zone 35 across the sinter material packing 2. This operational step which may become necessary as the calcination proceeds results in an enlarged calcining zone.

The features described above enable the operational steps to be adapted to the charging rate of sinter material, the temperature development inside the sinter material packing, measured perpendicularly with respect to the direction of motion of the sintering grate, and to the exhaust gas temperature.

The various possible gas flows necessitate means for separating the single zones from one another which alone permit exact flow of the single gas streams. Apart from switching arrangements for putting the various blowers into operation, the single flow lines and line groupings have shutoff and control members 53, and the single zones are separated from one another at a position above the packed sinter material 2 by means of coolable stripper beams 15, the drying zone being subdivided through partition walls 52 into drying chambers 3 to 7. In the region of calcining zone 35 and of sojourn/hardening zone 40, the upright partition walls 51 are extended upwardly between suction chambers 10, 23, 23 and 45, i.e. so as to extend to a position directly below the upper strand of sintering grate 1. The returning strand of sintering grate 1 runs with its overall length below suction chambers 8, 9, 10, 23, 23 and 45.

Abrasion fines of sinter material falling through the grate plates of cooling grate 47 accumulate in the lower portion of the suction chambers and are removed through double swing flaps, delivered to regulator 54 and discharged. Fines falling through in the region of delivering means 41 and of heat compensation zone 42 are collected in collecting funnel 55 and discharged. Pressure chamber 49 disposed below cooling grate 47, and the adjacent heat compensation zone 42 are substantially spaced from one another by packing 59 around which the slack strand of cooling grate 47 is arranged. Packings 60 and 61 disposed at the drive star of cooling grate 47 near the discharge end thereof prevent the cooling air from flowing around the hot sinter material packing on cooling grate 47 and from mixing with hot gases drawn off thereabove.

In the event of an unscheduled interruption of the apparatus which involves the danger of sintering grate 1 becoming overheaded, the emergency flaps 63 disposed in the region of calcining zone 35 and of sojourn/hardening zone 40 beneath the sintering grate are opened at once and residual exhaust gases and hot issuing gases are drawn off through suction socket 56 arranged above heat compensation zone 42, the said socket 56 being in communicating relationship with exhaust gas line 57 and with auxiliary chimney 58.

In the case of a scheduled interruption of the apparatus, the gases, here called issuing gases, set free from the hot sinter material are drawn off in alike manner and allowed to escape overhead.

The exact flow of exhaust gas and hot gas realized by the constructional modifications according to the present invention enable the drying zone to be fed with the total amount of waste heat delivered from the cooling grate, which is used as heating gas having a temperature of about 400° C.

As compared with the working method disclosed in the above-mentioned patent, the use of the total waste heat delivered from the cooling grate in the form of hot gas having a temperature of about 400° C. in the drying zone in addition to or in admixture with exhaust gas, and the exact exhaust gas and hot gas flow due to the means and steps employed according to the present invention result in 15 to 20% fuel gas being economized, related to the quantity of sinter material discharged from the furnace. In other words, merely about 240 to 280 kcal. heat are required per kg. furnace-finished sinter material.

The apparatus of the present invention for drying and calcining crude phosphate shapes and consisting of two series-connected conventional travelling grates, of which the second travelling grate running through a cooling zone is disposed at a lower level than the first travelling grate running through at least one drying chamber, at least one calcining chamber and a sojourn/hardening chamber, the transition area between the first and second travelling grates being located inside a heat compensation chamber and the individual chambers being separated from each other by interposed partition walls, comprises more especially partition walls 51 disposed between suction chambers 23, 23, 45 and extended to a level immediately below the upper strand of sintering grate 1 so as to improve spacing of individual zones and so as to permit more exact exhaust gas, hot gas and issuing gas flow; means permitting the return strand of sintering grate 1 to run outside the suction chambers 23, 23, 45; and a drying zone 3 to 7 having dimensions which enable exhaust gases temporarily withdrawn from a sojourn/hardening zone 40 and the total amount of hot gases set free in a cooling zone 34 as well as the total amount of exhaust gas obtained in a calcining zone 35 to be used for pre-drying and heating green pellets in the drying zone 3 to 7. The sojourn/hardening zone 40 is provided with shutoff and control means 53 which through an exhaust gas blower 32 alternatively enable exhaust gas to be withdrawn from the calcining zone 35 across a layer of sinter material 2 or enable removal of exhaust gas to be arrested, or by means of a chain cooling blower 39 enable hot gas coming from the cooling zone 34 to be injected into a suction chamber 45 against the upper strand of the sintering grate 1 for cooling purposes.

We claim:

In an apparatus for drying and calcining crude phosphate pellets, comprising at least one drying chamber, at least one following calcining chamber connected to said drying chamber, a following sojourn/hardening chamber connected to said calcining chamber, a heat compensation chamber connected to said sojourn/hardening chamber, a first travelling grate passing through said drying, calcining and sojourn/hardening chambers, a cooling chamber, a second travelling grate series-connected to and at a level lower than said first travelling grate, means for conveying the said phosphate pellets from the said first travelling grate to the said second travelling grate being located inside the said heat compensation chamber, and suction chambers being located below the said first travelling grate, the said individual chambers having gas inlet and gas outlet means being separated from each other by means of upper and lower partition walls, said upper partition walls being disposed above said phosphate pellets upon said travelling grate, the improvement which comprises the said lower partition walls being located between the said suction chambers and being extended to a level immediately below the upper strand of the said first travelling grate so as to improve the spacing of individual zones, a drying chamber extended to enable gas recycled and coming from the cooling and calcining chamber and from the sojourn/hardening chamber, respectively, to give off the bulk of its sensible heat and to leave the drying chamber at a temperature of 90 to 100° C., an exhaust gas blower being connected on its suction side to both the said heat compensation chamber and to the said cooling chamber and being connected on its pressure side to both the said drying chamber and to the suction side of a chain cooling blower, the pressure side of which is connected by lines with gas outlets located below the said first travelling grate in the said suction chamber which itself is located below the said sojourn/hardening chamber, wherein shutoff and control means are connected to the said exhaust gas blower and the said chain cooling blower so as to enable (a) exhaust gas to be removed from the said calcining chamber through the said sojourn/hardening and the said heat compensation chamber for temporary desirable spatial enlargement of the said calcining chamber, (b) hot gas coming from the said cooling chamber to be conveyed through the said exhaust blower into the said drying chamber, and (c) the said hot gas to be temporarily injected via the said two blowers into the suction chamber, respectively, for temporarily cooling of the said first travelling grate.

References Cited by the Examiner
UNITED STATES PATENTS

| | | | |
|---|---|---|---|
| 3,100,106 | 8/1963 | Bielenberg et al. | 263—8 |
| 3,189,336 | 6/1965 | Montagino | 263—35 |

DONLEY J. STOCKING, *Primary Examiner.*

JOHN J. CAMBY, FREDERICK L. MATTESON, JR., JAMES W. WESTHAVER, *Examiners.*